(12) United States Patent
Sehrer

(10) Patent No.: US 9,020,965 B1
(45) Date of Patent: Apr. 28, 2015

(54) SOCIAL NETWORKING RELATIONSHIP RANKING AND DECAY

(75) Inventor: Trevor Sehrer, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/248,349

(22) Filed: Sep. 29, 2011

(51) Int. Cl.
G06F 17/30 (2006.01)

(52) U.S. Cl.
CPC .................................. *G06F 17/3053* (2013.01)

(58) Field of Classification Search
CPC .................................................... G06F 17/3053
USPC ......................................................... 707/758
See application file for complete search history.

(56) References Cited

U.S. PATENT DOCUMENTS

| | | | | |
|---|---|---|---|---|
| 2005/0086211 | A1* | 4/2005 | Mayer | 707/3 |
| 2008/0189122 | A1* | 8/2008 | Coletrane et al. | 705/1 |
| 2009/0164574 | A1* | 6/2009 | Hoffman | 709/204 |
| 2009/0282104 | A1* | 11/2009 | O'Sullivan et al. | 709/204 |
| 2010/0274815 | A1* | 10/2010 | Vanasco | 707/798 |
| 2011/0040844 | A1* | 2/2011 | Lawler et al. | 709/206 |
| 2011/0173274 | A1* | 7/2011 | Sood | 709/206 |
| 2011/0231396 | A1* | 9/2011 | Dhara et al. | 707/731 |
| 2012/0011204 | A1* | 1/2012 | Morin et al. | 709/205 |
| 2012/0150888 | A1* | 6/2012 | Hyatt et al. | 707/758 |

OTHER PUBLICATIONS

Paul Mutton, Inferring and Visualizing Social Networks on Internet Relay Chat, 2004, IEEE, Proceedings of the Eighth International Conference on Information Visualization (IV'04), 9 pages.*

Danah M. Boyd et al., "Social Network Sites: Definition, History and Scholarship," Journal of Computer-Mediated Communication, vol. 13, Issue 1, Oct. 2007, pp. 210-230.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Nathan Eagle et al., "Social Serendipity: Proximity Sensing and Cueing," MIT Media Laboratory Technical Note 580, May 2004, 18 pages.

Andrew Leonard, "You are who you know," Salon Media Group, Inc., Jun. 15, 2004, 15 pages.

(Continued)

*Primary Examiner* — Apu Mofiz
*Assistant Examiner* — Dara J Glasser
(74) *Attorney, Agent, or Firm* — Fish & Richardson P.C.

(57) ABSTRACT

Methods, systems, and apparatus, including computer programs encoded on a computer storage medium, for retrieving connection score data for a user, the user being a user of a computer-implemented social networking service, the connection score data comprising one or more connections scores, each connection score reflecting a degree of interaction between the user and a respective contact, determining that a first connection score is less than or equal to a minimum connection score, the first connection score being associated with a first contact of the user within the social networking service, and, in response to determining that the first connection score is less than or equal to the minimum connection score, removing the first contact as a contact of the user within the social networking service.

21 Claims, 7 Drawing Sheets

(56) References Cited

OTHER PUBLICATIONS

Junichiro Mori et al., "Real-world Oriented Information Sharing Using Social Networks," Proceedings of the 2005 International ACM SIGGROUP Conference on Supporting Group Work (GROUP 05), Nov. 6-9, 2005, pp. 81-84.

Alice Emily Marwick, "Selling Your Self: Online Identity in the Age of a Commodified Internet," Thesis for degree of Master of Arts, University of Washington, 2005, 192 pages.

* cited by examiner

FIG. 4

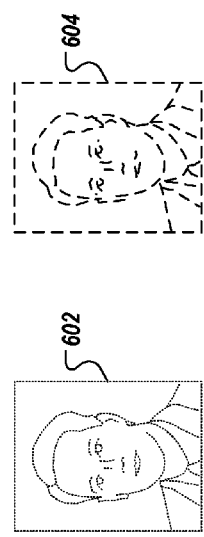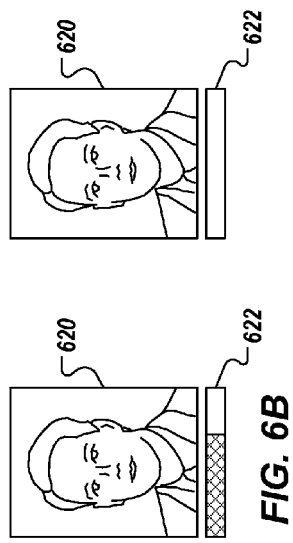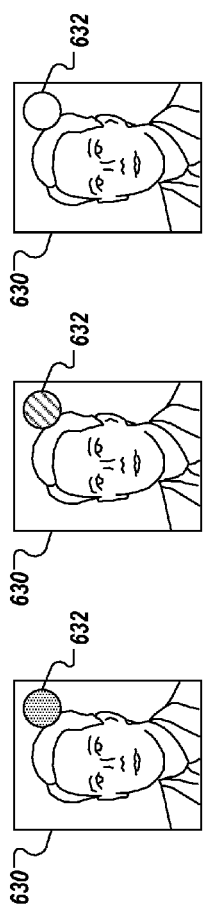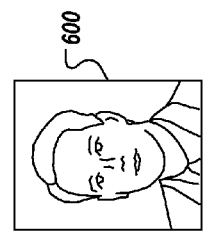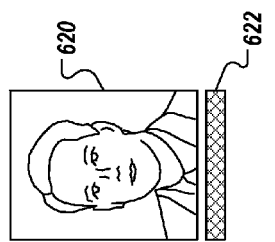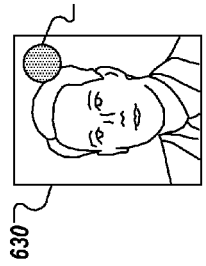
FIG. 6A    FIG. 6B    FIG. 6C

SOCIAL NETWORKING RELATIONSHIP RANKING AND DECAY

TECHNICAL FIELD

This specification generally relates to computer software systems and methods, in particular, systems and methods for relationship ranking and decay in a social networking service.

BACKGROUND

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

As a user's social network within the social networking service increases, the number of contacts of the user can increase. In some cases, the user can add contacts that the user rarely interacts with inside or outside of the social networking service. Consequently, the user's contacts within the social networking service can become cluttered with contacts that might be less relevant to the user in practical terms.

SUMMARY

In general, innovative aspects of the subject matter described in this disclosure may be embodied in methods that include the actions of retrieving connection score data for a user, the user being a user of a computer-implemented social networking service, the connection score data including one or more connection scores, each connection score reflecting a degree of interaction between the user and a respective contact, determining that a first connection score is less than or equal to a minimum connection score, the first connection score being associated with a first contact of the user within the social networking service, and, in response to determining that the first connection score is less than or equal to the minimum connection score, removing the first contact as a contact of the user within the social networking service.

In general, innovative aspects of the subject matter described in this disclosure may be embodied in methods that also include the actions of retrieving connection score data for a user, the user being a user of a computer-implemented social networking service, the connection score data including one or more connection scores, each connection score reflecting a degree of interaction between the user and a respective contact, and transmitting instructions to display contacts of the user in rank order based on respective connection scores.

Other implementations of these aspects include corresponding systems, apparatus, and computer programs, configured to perform the actions of the methods, encoded on computer storage devices.

These and other implementations may each optionally include one or more of the following features. For instance, actions further include revising at least one connection score based on one or more decay values, the one or more decay values reducing a value of the at least one connection score; revising the at least one connection score includes applying the one or more decay values to the at least one connection score based on a frequency at which the user engages the social networking service; the frequency is based on the user logging into the social networking service; the frequency is provided based on one or more interactions over a period of time; actions further include revising at least one connection score based on one or more interaction values, the one or more interaction values increasing a value of the at least one connection score; revising at least one connection score includes: determining that the at least one connection score is to be increased from a first value to a second value, determining that the second value is greater than a maximum value, and, in response to determining that the second value is greater than the maximum value, setting the at least one connection score equal to the maximum value; actions further include: establishing a symmetrical relationship between the user and a second contact within the social networking service, and, in response to establishing the symmetrical relationship, setting a second connection score equal to a maximum value, the second connection score being associated with the second contact; interaction between the user and a respective contact includes interaction within the social networking service; actions further include determining that the user has logged into the social networking service, wherein retrieving connection score data is executed in response to determining that the user has logged into the social networking service; actions further include determining that the user has logged out of the social networking service, wherein retrieving connection score data is executed in response to determining that the user has logged out of the social networking service; removing the first contact as a contact of the user within the social networking service includes converting a symmetric relationship between the user and the first contact to an asymmetric relationship; instructions include instructions to display a graphical visualization based on respective connection scores, each graphical visualization graphically depicting a relationship between the user and a respective contact; the graphical visualization includes a transparency of an image associated with a contact, the graphical visualization comprises a gauge associated with a contact, the graphical visualization includes an indicator associated with a contact; and instructions include instructions to display the contacts in a web page of the social networking service.

Implementations of the present disclosure provide one or more of the following example advantages. Implementations provide a social networking experience that is closely aligned with real-life social networks. Implementations also enables unused social connections to be passively broken (i.e., by a third party). In this manner, users are not required to migrate to another social networking service. Implementations also increase user engagement, because the user is only connected to people they meaningfully communicate with. Implementations further reduce the hardware requirements (e.g., processors and memory), because unwanted social connections are automatically pruned updates from the pruned social connections no longer need to be shown to the user.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 depicts a screen-shot of an example stream page for a user of a social networking service.

FIGS. 6A-6C depict example graphical visualizations of relationship decay in a social networking service.

Like reference numbers represent corresponding parts throughout.

DETAILED DESCRIPTION

Figure 1:
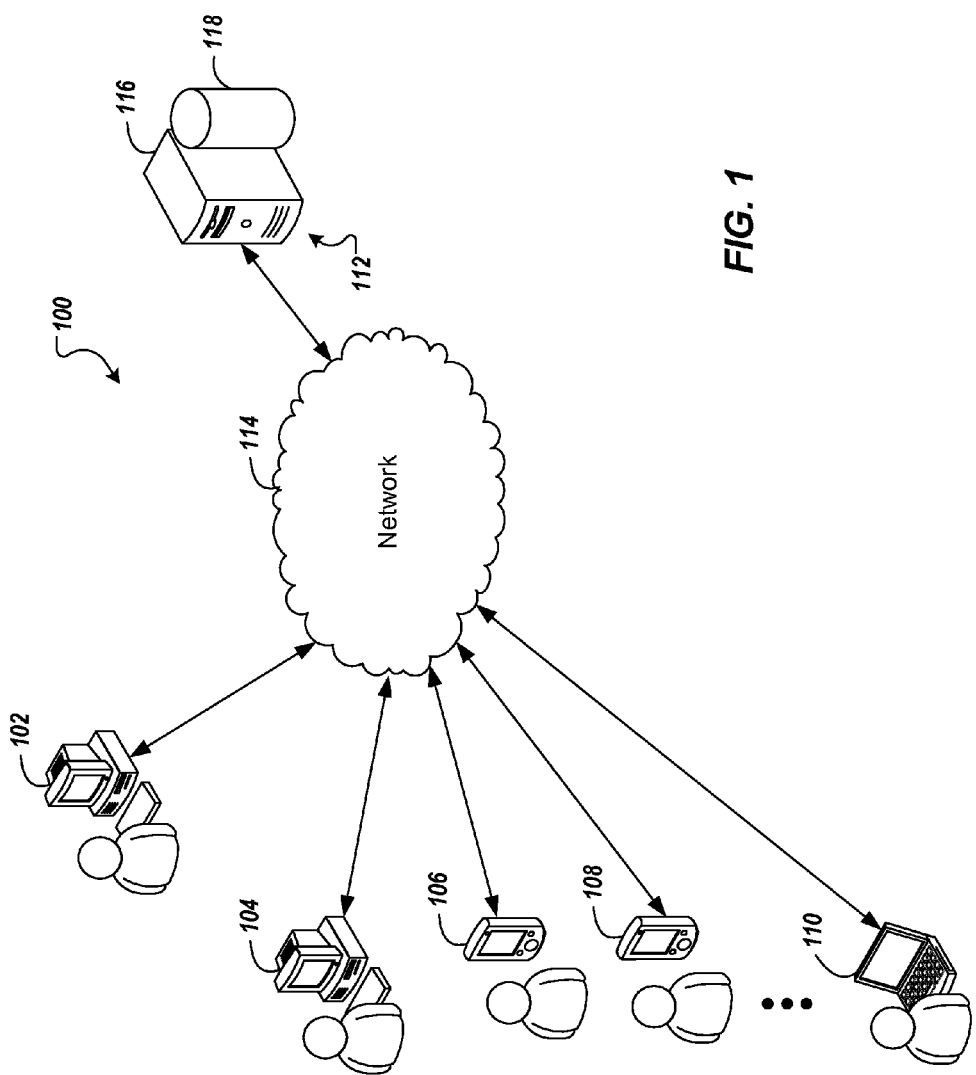
FIG. 1 is a diagram of an example network architecture.

In general, implementations of the present disclosure are directed to determining connection scores that each represents an interaction between a user and a respective contact within a computer-implemented social networking service. The connection scores reflect a degree of interaction between the user and each of the respective contacts. In some examples, contacts of the user can be displayed in a rank order based on the respective connection scores. In some examples, a graphical representation of a relationship between a user and a contact within the social networking service can be provided based on a respective connection score. In some examples, a relationship between a user and a contact within the social networking service can decay based on a respective connection score. In some examples, the relationship can decay to the point that the user and the contact are no longer considered as being connected within the social networking service.

In some implementations, the connection score can be determined based on a social affinity between the user and a contact. A social affinity between a particular user of the social networking service and other users of the social networking service can be determined based on a social graph of the particular user. In some examples, a social graph can refer to a single social graph or multiple interconnected social graphs. Distinct social graphs can be generated for different types of connections a user has. For example, a user can be connected with chat contacts in one social graph, email contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

In some implementations, a single social graph can be provided as a compilation of individual social graphs. In some examples, the first, second, third and/or fourth social graphs discussed above, can be combined for a particular user to provide a composite social graph that depicts the connection or potential connections of the particular user across multiple services (e.g., email, chat, social networking, matchmaking).

Types of connections and social graphs can include, but are not limited to other users in which the user is in direct contact (e.g., user mail or chat contact, direct contacts on social sites), users in which the user is in indirect contact (e.g., friends of friends, connections of users that have a direct connection to the user), and/or users in which a connection with the user is suggested (e.g., social networking and/or matchmaking). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

A social affinity score can be determined for a connection between a user and another user. The social affinity score can reflect a strength of a relationship between the users. By way of non-limiting example, a first user can be connected to a second user and a third user. The first user can the second user can be in frequent contact with one another via the social networking service (e.g., often sharing items with one another), email and/or chat. A first social affinity score can be provided based on the interaction between the first user and the second user. The first user and the third user might be infrequently in contact with one another. For example, the first user might have received an email from the third user only once in the last several months. A second social affinity score can be provided based on the interaction between the first user and the third user. In this example, the first social affinity score is greater than the second social affinity score, reflecting a closer relationship between the first user and the second user than between the first user and the third user.

In some implementations, connection scores between a user and contacts can be provided based on respective social affinity scores. In some examples, a connection score is provided if the user and the contact are direct contacts within the context of the social networking service. A direct contact can include a contact that shares a symmetrical relationship with the user within the social networking service. A symmetrical relationship includes the user and the contact having two-way interaction with one another through the social networking service (e.g., the user has added the contact as a contact within the social networking service, and the contact has added the user as a contact within the social networking service). An asymmetrical relationship can include the contact and the user not interacting with one another or having one-way interaction within the social networking service (e.g., the user has added the contact as a contact within the social networking service, but the contact has not added the user as a contact within the social networking service).

As discussed in further detail herein, the connection score between a user and a contact can fluctuate based on interactions between the user and the contact. In some examples, one or more decay factors can be applied to the connection score. In this manner, if there is no interaction between the user and the contact, the connection score decays over time. When the connection score is equal to or less than a threshold connection score, the relationship between the user and the contact within the social networking service can be deemed to be non-existent. In response, and in some examples, the contact can be removed as a contact of the user within the social networking service.

As discussed in further detail herein, connection scores between a user and respective contacts can be used to arrange the contacts in rank order. In some examples, the contacts can be displayed to the user in rank order with contacts associated with higher connections scores being displayed more prominently than contacts associated with lower connection scores.

For purposes of illustration, an example social networking service will be described. The example social networking service enables users to organize contacts into social circles. It is appreciated, however, that implementations of the present disclosure can be used in other types of social networking services and are not limited to social networking services that include social circles.

In general, social circles are categories to which a user can assign contacts and better control the distribution and visibility of social networking posts and/or other digital content distributed using the social networking service. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. As one example, the user can post an update about a work-related nuance to only a "coworker" circle, and spare other contacts within the social networking service from seeing information that is irrelevant to them.

Users can establish direct contacts and indirect contacts within the social networking service using social circles. For example, a first user can add a second user to a social circle. As a result, the first user and the second user are at least indirect contacts in the social networking service (i.e., an asymmetrical relationship exists). The second user can add the first user to a social circle. As a result, the first user and the second user are direct contacts in the social networking service (i.e., a symmetrical relationship exists).

FIG. 1 is a diagram of an example network architecture 100. The network architecture 100 includes a number of client devices 102-110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102-110 access the server device 112 to participate in a social networking service. For example, the client devices 102-110 can execute web browser applications that can be used to access the social networking service and/or an IM service. In another example, the client devices 102-110 can execute software applications that are specific to the social networking service and/or the IM service (e.g., social networking and/or IM "apps" running on smartphones).

Users interacting with the client devices 102-110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn."). Generally, users interacting with the client device 102-110 can also use the social networking service provided by the server system 112 to define social circles to organize and categorize the user's relationships to other users of the social networking service. Examples of the creation and use of social circles are provided in the description of FIG. 2.

In some implementations, the client devices 102-110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
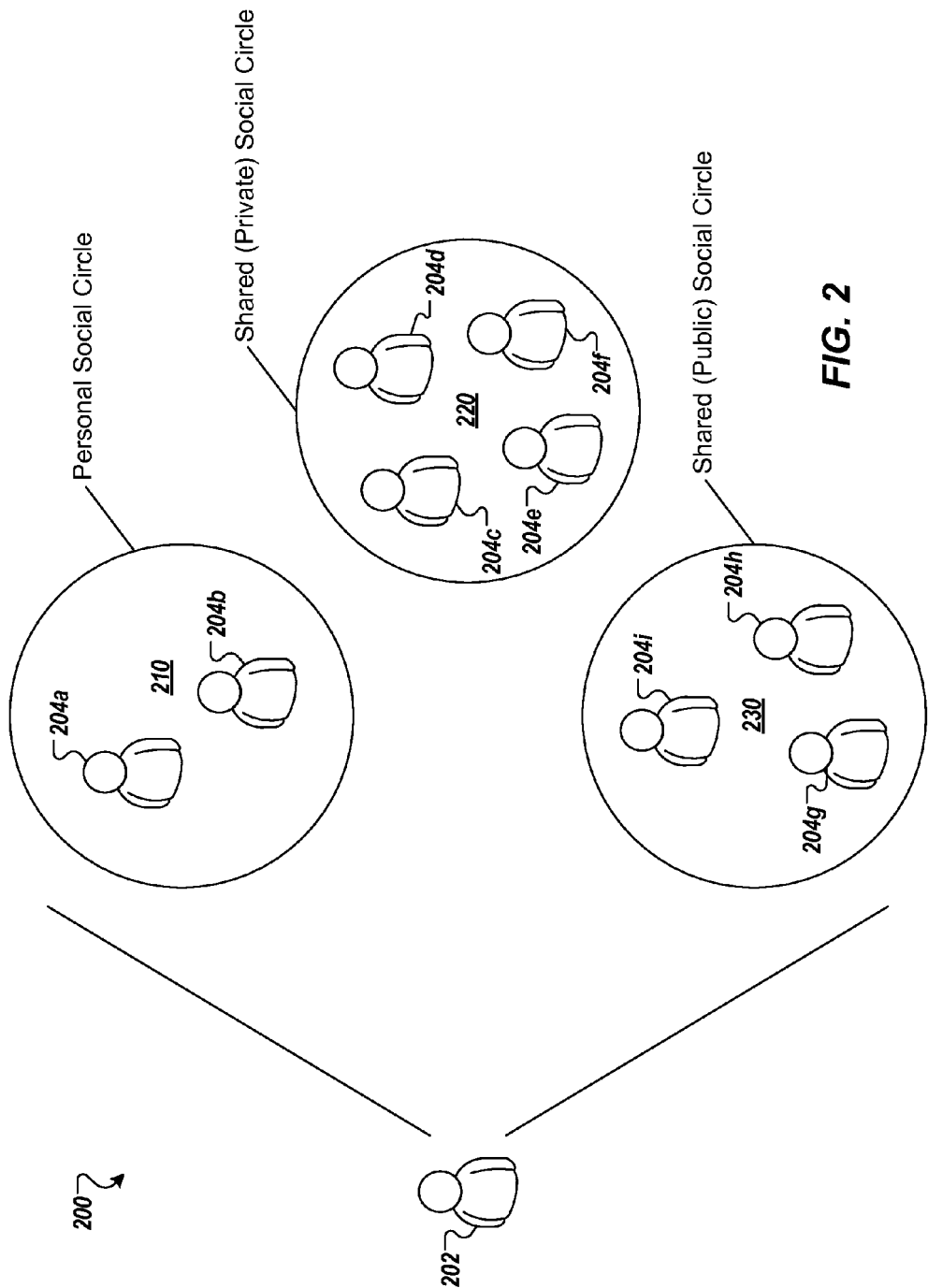
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230.

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, the distribution data is processed to provide an access control list (ACL) that specifies which contacts within the social networking system are granted access to the post content. In some implementations, social affinity scores can also be processed to provide the ACL. For example, the distribution data can indicate that the post content is to be accessible by and/or distributed to a particular user. A social affinity score can be determined for the post and can be specific to a relationship between the particular user and the author of the post. In some examples, if the social affinity score is below a threshold score, it is determined that the post content will not be accessible by and/or distributed to the particular user. Consequently, although the particular user had been explicitly targeted for distribution of the post by the author, the particular user is not provided in the ACL for the post. In some examples, if the social affinity score is at or above the threshold score, it is determined that the post content will be accessible by and/or distributed to the particular user. Consequently, the particular user had been explicitly targeted for distribution of the post by the author and the particular user is provided in the ACL for the post.

Generally, the distribution hub determines end points the post data set is to be distributed to based on the ACL. More specifically, the set of contacts that may care about the post and/or that are allowed access to the post is determined based on the ACL, and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

Users can interact with one another through the social networking service. In some examples, interaction can include original distribution of an item (i.e., when the item was posted to the social networking service), a comment appended to the item (e.g., when a user (either the author of the item or non-author of the item) posts a comment to the item), an endorsement of the item (e.g., when a user (either the author of the item or non-author of the item) indicates that they endorse the item), sharing of the item (e.g., when a non-author user re-posts, or otherwise redistributes the item within the social networking service).

Figure 3:
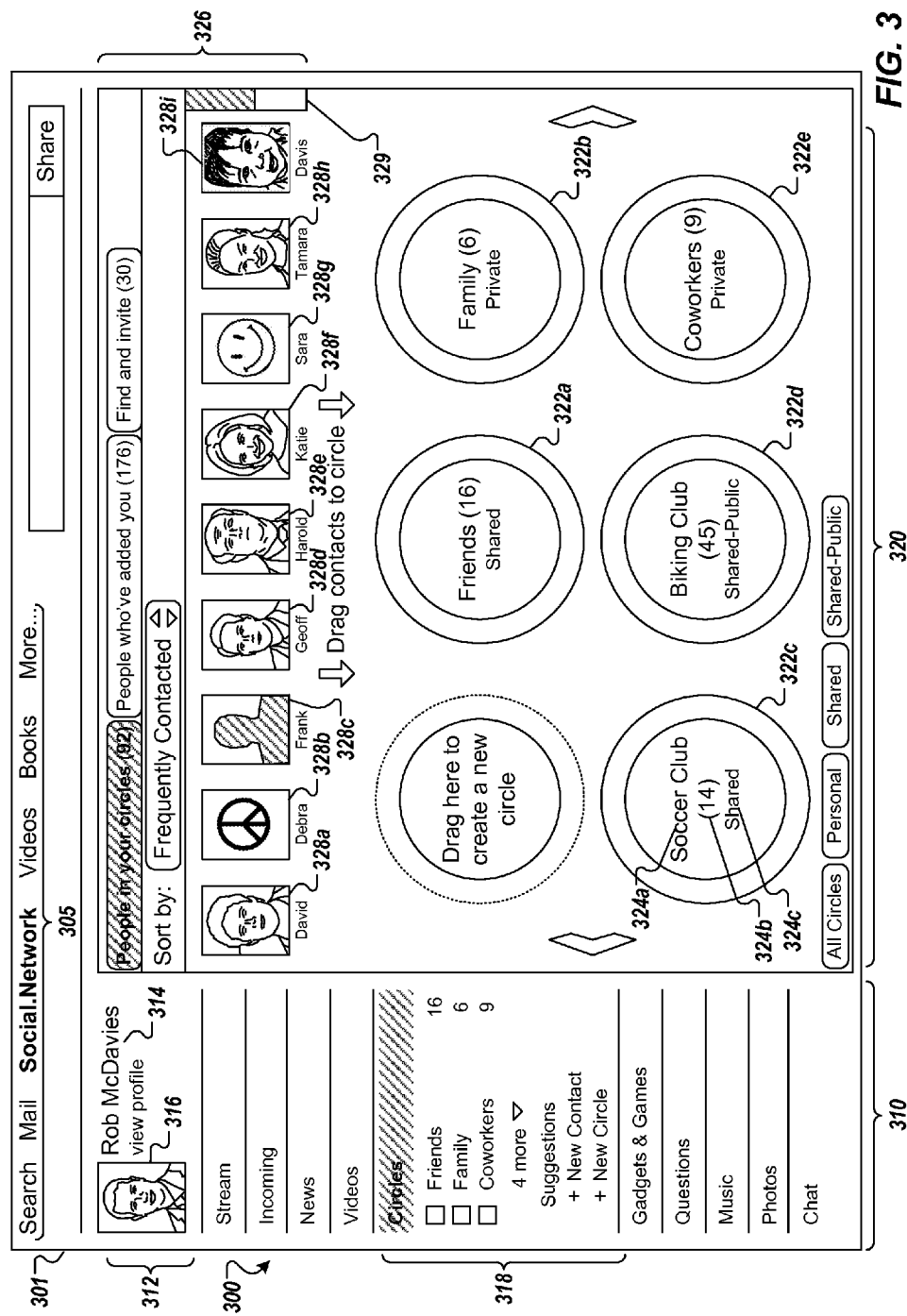
FIG. 3 depicts a screen-shot of example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

Figure 4:
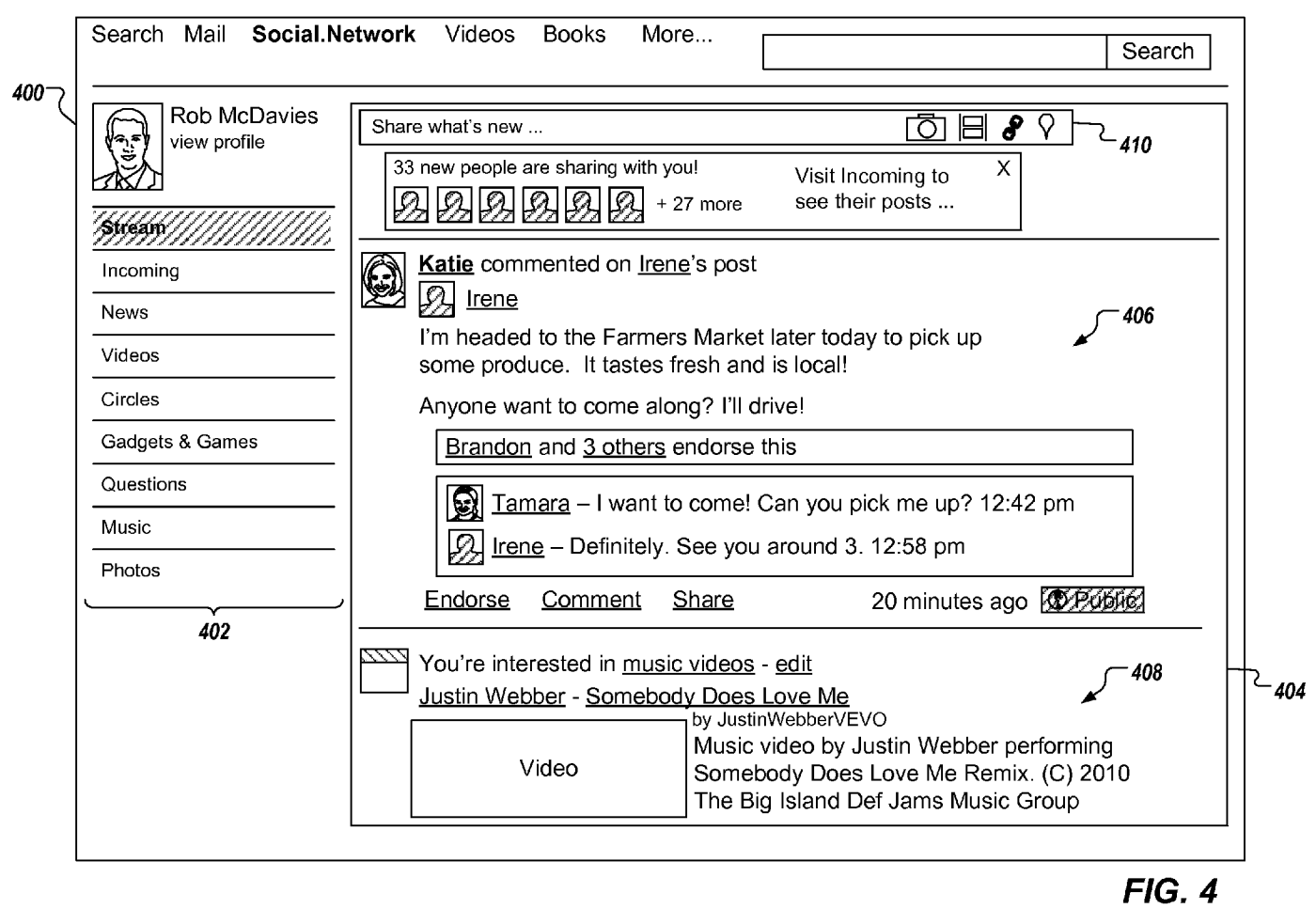

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McDavies" and the stream page 400 displays items (i.e., digital content) that other users have shared with the user and/or items that the user has shared with other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

As introduced above, implementations of the present disclosure are directed to determining connection scores that each represents an interaction between a user and a respective contact within a computer-implemented social networking service. The connection scores reflect a degree of interaction between the user and each of the respective contacts. In some examples, contacts of the user can be displayed in a rank order based on the respective connection scores. In some examples, a graphical representation of a relationship between a user and a contact within the social networking service can be provided based on a respective connection score. In some examples, a relationship between a user and a contact within the social networking service can decay based on a respective connection score. In some examples, the relationship can decay to the point that the user and the contact are no longer considered as being connected within the social networking service.

In some implementations, a connection score (CS) between a user and a contact is user- and contact-specific and is determined based on the social affinity between the user and the contact. In some examples, the connection score is determined based on interactions between the user and the contact within the social networking service. Example interactions can include original distribution of an item (i.e., when the item was posted to the social networking service), a comment appended to the item (e.g., when a user (either the author of the item or non-author of the item) posts a comment to the item), an endorsement of the item (e.g., when a user (either the author of the item or non-author of the item) indicates that they endorse the item), sharing of the item (e.g., when a non-author user re-posts, or otherwise redistributes the item within the social networking service).

In some examples, interactions can be considered equal. In this manner, any interaction between the user and the contact can equally contribute to an increase in the connection score. For example, if the user distributes an item using the social networking service and the contact is included in the associated distribution, the connection score is increased by a value. If the user comments on an item that the contact has distributed, the connection score can be increased by the value. If the user endorses an item that the contact has distributed, the connection score can be increased by the value. If the user re-shares an item that the contact has distributed, the connection score can be increased by the value.

In some examples, different interactions can contribute differently to an increase in the connection score. In some examples, a weight can be determined based on interaction type and the weight can be applied to such that the interaction contributes to an increase in the connection score by a different value than other interactions. In one example, the user can distribute an item using the social networking service and the contact can be included in the distribution. Consequently, a "distribution to" interaction is provided and a first weight can be associated therewith. In response to the interaction, the connection score can be increased by a product of the first weight and a value. In another example, the contact can distribute an item using the social networking service and the user can be included in the distribution. Consequently, a "distribution from" interaction is provided and a second weight can be associated therewith. In response to the interaction, the connection score can be increased by a product of the second weight and the value. In another example, the user can comment on an item distributed by the contact using the social networking service. Consequently, a "comment to" interaction is provided and a third weight can be associated therewith. In response to the interaction, the connection score can be increased by a product of the third weight and the value.

In another example, the contact can comment on an item distributed by the user using the social networking service. Consequently, a "comment from" interaction is provided and a fourth weight can be associated therewith. In response to the interaction, the connection score can be increased by a product of the fourth weight and the value. In another example, the user can share an item distributed by the contact using the social networking service. Consequently, a "re-share to" interaction is provided and a fifth weight can be associated therewith. In response to the interaction, the connection score can be increased by a product of the fifth weight and the value. In another example, the contact can share an item distributed by the user using the social networking service. Consequently, a "re-share from" interaction is provided and a sixth weight can be associated therewith. In response to the interaction, the connection score can be increased by a product of the sixth weight and the value. In another example, the user can endorse on an item distributed by the contact using the social networking service. Consequently, an "endorse to" interaction is provided and a seventh weight can be associated therewith. In response to the interaction, the connection score can be increased by a product of the seventh weight and the value. In another example, the contact can endorse on an item distributed by the user using the social networking service. Consequently, an "endorse from" interaction is provided and an eighth weight can be associated therewith. In response to the interaction, the connection score can be increased by a product of the eighth weight and the value.

In some implementations, the connection score is determined based on interactions between the user and the contact within the social networking service and within one or more other services. Example other services can include an email service, a chat service and/or a blogging service. Accordingly, the connection score can be provide as a function of a plurality of connection scores, one connection score being based on interactions in the context of the social networking service and one or more other connection scores being based on interactions in the context of each of the other services.

For example, the user and the contact can interact using the social networking service and can interact through an email service. A social networking service connection score can be provided and can be based on interactions between the user and the contact within the social networking service, as discussed above. An email connection score can be provided (e.g., from a scoring service) and can be based on interactions between the user and the contact within the email service. An overall connection score can be determined based on the social networking service connection score and the email service connection score. In some examples, the overall connection score can be provided as a sum of the connections scores. In some examples, respective weights can be applied to the social networking service connection score and the email service connection score. In some examples, the email service connection score can be weighted to have less of an influence on the overall connection score than the email service connection score. In this manner, the email service can be reflected as a more intimate interaction than social networking service interactions.

In some examples, the overall connection score can be based on a chat service connection score. The chat service connection score can be provided (e.g., from a scoring service) and can be based on interactions between the user and the contact within the chat service (i.e., instant messages sent between the user and the contact). In some examples, a weight can be applied to the chat connection score to have more of an influence on the overall connection score than the email service connection score and/or the social networking service connection score. In this manner, the chat service can be reflected as a more intimate interaction than social networking service and/or the email service interactions.

An index of connection scores can be provided for each user of the social networking service. In some examples, the index of connection scores includes a list of contacts that are direct contacts of the user within the social networking service and a respective connection score associated therewith. In some examples, the connection scores can be retrieved from a scoring system, as discussed herein. With reference to the example of FIG. 3, an example index of connection scores for the user Rob McDavies can be provided as:

| Contact | Connection Score (CS) |
|---|---|
| $ID_{DAVID}$ | $CS_{DAVID}$ |
| $ID_{DEBRA}$ | $CS_{DEBRA}$ |
| $ID_{FRANK}$ | $CS_{FRANK}$ |
| $ID_{GEOFF}$ | $CS_{GEOFF}$ |
| $ID_{HAROLD}$ | $CS_{HAROLD}$ |
| $ID_{KATIE}$ | $CS_{KATIE}$ |
| $ID_{SARA}$ | $CS_{SARA}$ |
| $ID_{TAMARA}$ | $CS_{TAMARA}$ |
| $ID_{DAVIS}$ | $CS_{DAVIS}$ |

In the example index of connection scores, ID indicates a unique identifier associated with a respective contact. In some examples, a unique identifier can include an email address of the contact. The respective connection scores can be determined as discussed herein.

In some implementations, a connection score can be set at a maximum value (e.g., 1) when the direct relationship (e.g., a symmetrical relationship) is established between the user and the contact within the social networking service. For example, a first user adds a second user as a contact within the social networking service. The second user subsequently adds the first user as a contact within the social networking service, establishing a symmetrical relationship between the first user and the second user. In response to establishment of the symmetrical relationship, a connection score between the first user and the second user can be set to the maximum value.

In some examples, the connection score does not exceed the maximum value. For example, a connection score between the first user and the second user can be at a first value that is less than the maximum value. Interactions can occur between the first user and the second user, such that the connection score is to be increased to a second value that is greater than the maximum value. Consequently, the connection score is set equal to the maximum value.

In some implementations, a connection score can be protected from decay for one or more contacts. In some examples, the relationship between the user and the contact can be more significant than what is reflected within the computer-implemented social networking service. By way of non-limiting example, a husband-wife pair can be considered such that the user can include the husband and the contact can include the wife. The user and the contact, being husband and wife, might have significant real-world interaction on a daily basis. Consequently, interactions between the user and the contact might occur less frequently within the social networking service. By protecting the connection score between the user and the contact from decay, the online relationship between the user and the contact within the social networking service can be maintained although there might be minimal interaction between the user and the contact within the social networking service.

In some implementations, a user interface can be provided that can receive user input indicating whether a connection score between the user and a particular contact is to be protected from decay. In some examples, the user interface can include a checkbox interface such that, when the user checks a checkbox associated with the contact, the connection score between the user and the contact is protected from decay. In this manner, although the user might not interact with the contact very often, the online relationship between the user and the contact within the social networking service can be maintained. By way of non-limiting example, the user and the contact could have been close friends in high school and are connected via the social networking service. Although the user and the contact might not interact frequently, the user might want to maintain the relationship within the social networking service (e.g., to not lose contact with a previously long lost friend).

In some implementations, protection of connection scores can be provided based on social circles. In some examples, the user can assign one or more contacts to a social circle. Because the contacts are members of the social circle, the connection scores between the users and the respective contacts can be protected from decay. By way of non-limiting example, contacts of the user can include parents, siblings, children, spouse and/or extended family of the user. Consequently, the user can assign each of the contacts to a family social circle. Because the contacts are members of the family social circle, the connection scores between the users and the respective contacts can be protected from decay. Although the user and the family contacts might not interact frequently, the user might want to maintain the relationships within the social networking service (e.g., to not lose online contact with family).

As discussed herein, the connection score between a user and a contact can decay based on a lack of online interaction between the user and the contact. In some examples, a decay value can be applied to the connection score. For example, the decay value can be periodically subtracted from the connection score. As another example, the connection score can be periodically multiplied by the decay value.

In some implementations, the decay value can be applied to the connection score based on a frequency at which the user engages the social networking service. In some examples, the frequency can be provided based on the user logging onto the social networking service. In some examples, whether the decay value is to be applied to the connection score can be determined for each log in. By way of non-limiting example, if the user logs into the social networking service, but does not interact with the contact during the session, the decay value is applied to the connection score. In some examples, whether the decay value is to be applied to the connection score can be determined based on a plurality of log ins. By way of non-limiting example, if the user logs into the social networking service X times, but does not interact with the contact during any of the respective sessions, the decay value is applied to the connection score.

In some examples, the frequency can be provided based on interaction(s) over a period of time. In some examples, whether the decay value is to be applied to the connection score can be determined based on a number of interactions over the period of time. By way of non-limiting example, if the user interacts with the contact equal to or less than a threshold number of times over the period of time, the decay value is applied to the connection score (e.g., the user interacts with the contact X number of times over the last month).

In some implementations, a strength and/or the existence of a relationship between the user and the contact can be determined based on the connection score. In some examples, if the connection score is less than or equal to a threshold connection score, the contact is removed from the user's social network within the social networking service. In some examples, the strength of relationship can be graphically displayed based on the connection score. In some examples, an image of the contact that is displayed to the user can fade as the connection score decreases. In some examples, a graphically depicted relationship gauge can be set based on the connection score.

In some implementations, contacts can be displayed to the user in rank order based on connection score. In some examples, contacts having a higher connection score are displayed more prominently than contacts having a lower connection score relative to one another. With reference to the example of FIG. 3, and the example index of connection scores above, the contact David can have the highest connection score and the contact Davis can have the lowest connections score. Consequently, the contacts are displayed in descending order based on connection score from David to Davis. In some examples, if the connection scores of two or more contacts are equal, the contacts can be displayed adjacent to one another in alphabetical order. In the example of FIG. 3, $CS_{DAVID}$ and $CS_{DEBRA}$ can be equal and, consequently, David is displayed ahead of Debra based on alphabetical order.

Figure 5:
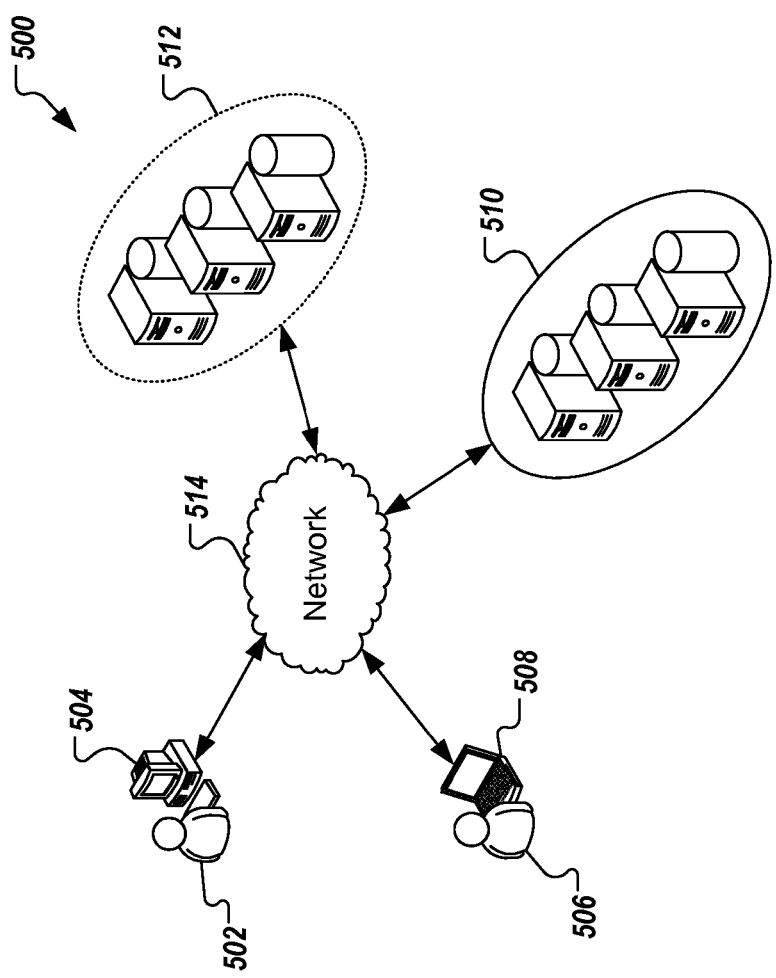
FIG. 5 depicts an example system for social networking relationship ranking and decay.

FIG. 5 depicts an example system 500 for social networking relationship ranking and decay. The example system 500 includes a first user 502 interacting with a first computing device 504, a second user 506 interacting with a second computing device 508, a first server system 510, a second server system 512 and a network 514. The first computing device 504, the second computing device 508, the first server system 510 and the second server system 512 can communicate with one another over the network 514.

In some implementations, a social networking service is provided and can be executed using the first and second server systems 510, 512. In some examples, the first server system 510 can receive, store and distribute items posted to the social networking service by users of the social networking service (e.g., the first user 502 and the second user 506). In some examples, the first server system 510 can monitor occurrences of events (e.g., item generation/distribution, comments, endorsements, sharing) and can determine which users are to receive the event (e.g., which users to deliver an item to). The first server system 510 can provide event data to the second server system. In some examples, the second server system 512 provides a scoring service. The scoring service can determine the connection scores discussed herein and can provide the connection scores to the first server system 510 for social network relationship ranking and decay.

FIGS. 6A-6C depict example graphical visualizations of relationship decay in a social networking service. With particular reference to FIG. 6A an image 600 of a contact can be displayed to a user. The image 600 can be an un-faded image that reflects a connection score that is greater than a first threshold connection score. An image 602 of the contact can be displayed to the user. The image 602 can be a faded image that reflects a connection score that is less than or equal to the first threshold connection score and that is greater than a second threshold connection score. An image 604 of the contact can be displayed to the user. The image 604 can be a more severely faded image that reflects a connection score that is less than or equal to the second threshold connection score and that is greater than a third threshold connection score. In some examples, if the connection score is less than or equal to the third threshold connection score, the image of the contact can disappear. In general, a transparency of the image can be adjusted based on the connection score.

With particular reference to FIG. 6B, an image 620 of a contact can be displayed to a user and can include an associated gauge 622. The gauge 622 can graphically depict the connection score and can increase or decrease based on changes in the connection score. With particular reference to FIG. 6C, an image 630 of a contact can be displayed to a user and can include an associated indicator 632. A characteristic (e.g., size, shape, color and/or pattern) of the indicator 632 can change based on the connection score.

Figure 7:
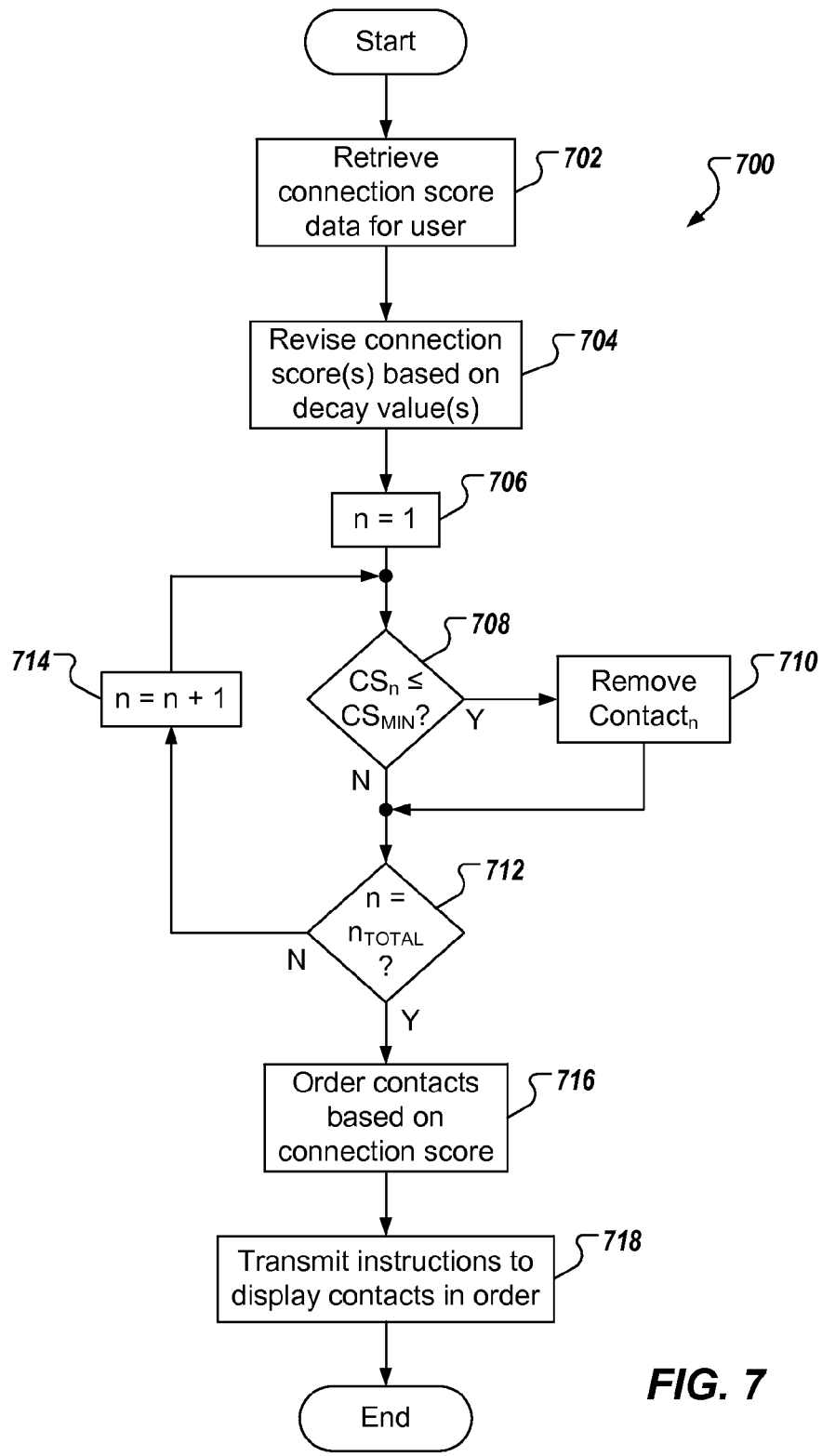
FIG. 7 is a flowchart of an example process that can be executed in implementations of the present disclosure.

FIG. 7 is a flowchart of an example process 700 that can be executed in implementations of the present disclosure. In some implementations, the example process 700 can include operations that are performed using one or more computer programs executed using one or more data processing apparatus (e.g., one or more client-side computing devices and/or one or more server-side computing devices). The example process 700 can be used for social networking relationship ranking and decay, as discussed herein.

Connection score data is retrieved for a particular user (702). In some examples, the connection score data is provided as a connection score index that includes a respective connection score for each of one or more contacts of the particular user within a social networking service (e.g., the example connection score index described above). The connection scores are revised based on one or more decay values (704). In some examples, and as discussed above, the decay value can be applied to the connection scores based on a frequency at which the user engages the social networking service. In some examples, the frequency can be provided based on the user logging onto the social networking service. In some examples, whether the decay value is to be applied to the connection score can be determined for each log in. In some examples, the frequency can be provided based on interaction(s) over a period of time. In some examples, whether the decay value is to be applied to the connection score can be determined based on a number of interactions over the period of time.

A counter n is set equal to one (706). It is determined whether a connection score ($CS_n$) is less than or equal to a minimum connection score ($CS_{MIN}$) (708). In some examples, $CS_n$ corresponds to a particular contact ($Contact_n$) of the user within the social networking service. If $CS_n$ is less than or equal to $CS_{MIN}$, $Contact_n$ is removed as a contact of the user within the social networking service (710). In some examples, $Contact_n$ is removed as a symmetric contact, but remains an asymmetric contact of the user within the social networking service. In some examples, $Contact_n$ is completely removed as a contact of the user within the social networking service. If $CS_n$ is not less than or equal to $CS_{MIN}$, it is determined whether n equal to $n_{TOTAL}$ (712).

If n is not equal to $n_{TOTAL}$, not all of the contacts of the user have been considered. Consequently, n is incremented (714) and the example process 700 loops back. If n is equal to $n_{TOTAL}$, all of the contacts of the user have been considered. Contacts are ordered based on connection score (716). In some examples, contacts are ordered in descending order of connection score. Instructions are transmitted to display the contacts in order (718). In some examples, the contacts are displayed in a contact display of a web page of the social networking service (e.g., the contact display 326 of FIG. 3). In some examples, the contacts are displayed with graphical visualizations of relationship decay (e.g., the example graphical visualizations of FIGS. 6A-6C).

In some examples, revision of the connection scores and/or determining whether to remove a particular contact as a contact of the user within the social networking service can occur in response to the user logging into the social networking service. In some examples, revision of the connection scores and/or determining whether to remove a particular contact as a contact of the user within the social networking service can occur in response to the user logging out of the social networking service. In such examples, the instructions to display contacts in order can be transmitted in response to the user logging back into the social networking service. In some examples, revision of the connection scores and/or determining whether to remove a particular contact as a contact of the user within the social networking service can occur on a pre-determined, periodic basis.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A system comprising:
    a computing device including a processor; and
    a computer-readable medium coupled to the computing device and having instructions stored thereon which, when executed by the computing device, cause the computing device to perform operations comprising:
        retrieving connection score data for a user, the user being a user of a plurality of computer-implemented services, the plurality of computer-implemented services including a computer-implemented social networking service, the connection score data comprising two or more connection scores, each connection score being based on a plurality of sub-connection scores that are each specific to a computer-implemented service of the plurality of computer-implemented services and that each reflect a degree of interaction between the user and a respective contact within the computer-implemented service;
        identifying a first connection score associated with a first contact of the user within the social networking service and a second connection score associated with a second contact of the user within the social networking service, the first and the second connection scores each being based on two or more of the sub-connection scores that are specific to respective computer-implemented services;
        applying one or more decay factors to the first connection score based on a frequency of one or more interactions over a period of time between the user and the first contact, the one or more decay factors modifying a value of the first connection score;
        in response to determining that the first connection score is less than or equal to a threshold connection score, removing the first contact as a contact of the user within the social networking service;
        receiving user input associated with the user assigning the second contact to a particular social circle within the social networking service, wherein respective connection scores associated with one or more users assigned to the particular social circle are protected from decay; and
        in response to receiving the user input, protecting, by the processor, the second connection score from decay by preventing application of the one or more decay factors to the second connection score to maintain the second contact as a contact of the user within the social networking service.

2. The system of claim 1, wherein the operations further comprise revising at least one connection score based on one or more interaction values, the one or more interaction values increasing a value of the at least one connection score.

3. The system of claim 2, wherein revising the at least one connection score comprises:
   determining that the at least one connection score is to be increased from a first value to a second value;
   determining that the second value is greater than a maximum value; and
   in response to determining that the second value is greater than the maximum value, setting the at least one connection score equal to the maximum value.

4. The system of claim 1, wherein the operations further comprise:
   establishing a symmetrical relationship between the user and a third contact within the social networking service; and
   in response to establishing the symmetrical relationship, setting a third connection score equal to a maximum value, the third connection score being associated with the third contact.

5. The system of claim 1, wherein interaction between the user and a respective contact comprises interaction within the social networking service.

6. The system of claim 1, wherein the operations further comprise determining that the user has logged into the social networking service, wherein retrieving connection score data is executed in response to determining that the user has logged into the social networking service.

7. The system of claim 1, wherein the operations further comprise determining that the user has logged out of the social networking service, wherein retrieving connection score data is executed in response to determining that the user has logged out of the social networking service.

8. A non-transitory machine-readable storage device encoded with one or more computer programs, the one or more computer programs comprising instructions that when executed by data processing apparatus cause the data processing apparatus to perform operations comprising:
   retrieving connection score data for a user, the user being a user of a plurality of computer-implemented services, the plurality of computer-implemented services including a computer-implemented social networking service, the connection score data comprising two or more connection scores, each connection score being based on a plurality of sub-connection scores that are each specific to a computer-implemented service of the plurality of computer-implemented services and that each reflect a degree of interaction between the user and a respective contact within the computer-implemented service;
   identifying a first connection score associated with a first contact of the user within the social networking service and a second connection score associated with a second contact of the user within the social networking service, the first and the second connection scores each being based on two or more of the sub-connection scores that are specific to respective computer-implemented services;
   applying one or more decay factors to the first connection score based on a frequency of one or more interactions over a period of time between the user and the first contact, the one or more decay factors modifying a value of the first connection score;
   in response to determining that the first connection score is less than or equal to a threshold connection score, removing the first contact as a contact of the user within the social networking service;
   receiving user input associated with the user assigning the second contact to a particular social circle within the social networking service, wherein respective connection scores associated with one or more users assigned to the particular social circle are protected from decay; and
   in response to receiving the input, protecting the second connection score from decay by preventing application of the one or more decay factors to the second connection score to maintain the second contact as a contact of the user within the social networking.

9. A computer-implemented method comprising:
   retrieving, from computer-readable memory, connection score data for a user, the user being a user of a plurality of computer-implemented services, the plurality of computer-implemented services including a computer-implemented social networking service, the connection score data comprising two or more connection scores, each connection score being based on a plurality of sub-connection scores that are each specific to a computer-implemented service of the plurality of computer-implemented services and that each reflect a degree of interaction between the user and a respective contact within the computer-implemented service;
   identifying, using one or more processors, a first connection score associated with a first contact of the user within the social networking service and a second connection score associated with a second contact of the user within the social networking service, the first and the second connection scores each being based on two or more of the sub-connection scores that are specific to respective computer-implemented services;
   applying one or more decay factors to the first connection score based on a frequency of one or more interactions over a period of time between the user and the first contact, the one or more decay factors modifying a value of the first connection score;
   in response to determining that the first connection score is less than or equal to a threshold connection score, removing the first contact as a contact of the user within the social networking service;
   receiving user input associated with the user assigning the second contact to a particular social circle within the social networking service, wherein respective connection scores associated with one or more users assigned to the particular social circle are protected from decay; and
   in response to receiving the user input, protecting the second connection score from decay by preventing application of the one or more decay factors to the second connection score to maintain the second contact as a contact of the user within the social networking service.

10. A system comprising:
   a computing device including a processor; and
   a computer-readable medium coupled to the computing device and having instructions stored thereon which, when executed by the computing device, cause the computing device to perform operations comprising:
      retrieving connection score data for a user, the user being a user of a plurality of computer-implemented services, the plurality of computer-implemented services including a computer-implemented social networking service, the connection score data comprising two or more connection scores, each connection score being based on a plurality of sub-connection scores that are each specific to a computer-implemented service of the plurality of computer-implemented services and that each reflect a degree of interaction between the user and a respective contact within the computer-implemented service;
      identifying a first connection score associated with a first contact of the user within the social networking service and a second connection score associated with a second contact of the user within the social networking service, the first and the second connection scores each being based on two or more of the sub-connection scores that are specific to respective computer-implemented services;

applying one or more decay factors to the first connection score based on a frequency of one or more interactions over a period of time between the user and the first contact, the one or more decay factors modifying a value of the first connection score;

in response to determining that the first connection score is less than or equal to a threshold connection score, removing the first contact as a contact of the user within the social networking service receiving user input associated with the user assigning the second contact to a particular social circle within the social networking service, wherein respective connection scores associated with one or more users assigned to the particular social circle are is protected from decay;

in response to the receiving the user input, protecting, by the processor, the second connection score from decay by preventing application of the one or more decay factors to the second connection score to maintain the second contact as a contact of the user within the social networking service; and transmitting instructions to display the first and the second contact of the user in rank order based on respective connection scores.

11. The system of claim 10, wherein the instructions comprise instructions to display a graphical visualization based on respective connection scores, each graphical visualization graphically depicting a relationship between the user and the respective contact.

12. The system of claim 11, wherein the graphical visualization comprises a transparency of an image associated with a contact.

13. The system of claim 11, wherein the graphical visualization comprises a gauge associated with a contact.

14. The system of claim 11, wherein the graphical visualization comprises an indicator associated with a contact.

15. The system of claim 10, wherein the instructions comprise instructions to display the contacts in a web page of the social networking service.

16. The system of claim 10, wherein the operations further comprise revising at least one connection score based on one or more interaction values, the one or more interaction values increasing a value of the at least one connection score.

17. The system of claim 16, wherein revising the at least one connection score comprises:

determining that the at least one connection score is to be increased from a first value to a second value;

determining that the second value is greater than a maximum value; and in response to determining that the second value is greater than the maximum value, setting the at least one connection score equal to the maximum value.

18. The system of claim 10, wherein the operations further comprise:

establishing a symmetrical relationship between the user and a third contact within the social networking service; and in response to establishing the symmetrical relationship, setting a third connection score equal to a maximum value, the third connection score being associated with the third contact.

19. The system of claim 10, wherein interaction between the user and a respective contact comprises interaction within the social networking service.

20. The system of claim 10, wherein the operations further comprise determining that the user has logged into the social networking service, wherein retrieving connection score data is executed in response to determining that the user has logged into the social networking service.

21. The system of claim 1, wherein receiving the user input comprises receiving a selection of a user-selectable interface element that is associated with the second contact and is presented for display on a graphical user interface of a computing device associated with the user.

* * * * *